US011556123B2

(12) United States Patent
Wang et al.

(10) Patent No.: US 11,556,123 B2
(45) Date of Patent: Jan. 17, 2023

(54) MESSAGING-ENABLED UNMANNED AERIAL VEHICLE

(71) Applicant: Twitter, Inc., San Francisco, CA (US)

(72) Inventors: Ya-Ting Wang, San Francisco, CA (US); Wayne Robins, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 253 days.

(21) Appl. No.: 16/915,056

(22) Filed: Jun. 29, 2020

(65) Prior Publication Data

US 2021/0055722 A1 Feb. 25, 2021

Related U.S. Application Data

(63) Continuation of application No. 15/421,672, filed on Feb. 1, 2017, now Pat. No. 10,698,401, which is a
(Continued)

(51) Int. Cl.
*G06F 17/00* (2019.01)
*G05D 1/00* (2006.01)
*H04L 51/52* (2022.01)

(52) U.S. Cl.
CPC ............ *G05D 1/0022* (2013.01); *H04L 51/52* (2022.05)

(58) Field of Classification Search
CPC .............................. G05D 1/0022; H04L 51/52
(Continued)

(56) References Cited

U.S. PATENT DOCUMENTS 5,308,022 A * 5/1994 Cronkhite ................ F41G 3/26
434/14
8,509,968 B1 * 8/2013 Saccone ............. G05B 13/0205
342/36
(Continued)

FOREIGN PATENT DOCUMENTS

AU 2014 200 051 1/2014

OTHER PUBLICATIONS

24th International Symposium on Automation & Robotics in Construction [online], "Guiding Robots Using Mobile Phone," Jan. 1, 2007, [retrieved on Apr. 2, 2018], retrieved from: URL<http://www.iaarc.org/publications/fulltext/isarc2007-3.2 6 037.pdf>, 6 pages.
(Continued)

*Primary Examiner* — Ronnie M Mancho
(74) *Attorney, Agent, or Firm* — Fish & Richardson P.C.

(57) ABSTRACT

An unmanned aerial vehicle (UAV) carries a camera, sends data from the camera, and receives commands. The UAV is connected to a messaging platform. Pictures or video clips received from the UAV are selected and placed in messages broadcast by an account associated with the UAV. Video footage from the camera is live-streamed in a card-type message. Account holders of the messaging platform may control the UAV with commands embedded in messages and directed towards an account associated with the UAV. Controllable elements of the UAV include UAV location, camera orientation, camera subject, UAV-mounted lighting, a UAV-mounted display, a UAV-mounted projector, UAV-mounted speakers, and a detachable payload. UAV control may be determined through democratic means. Some UAV functionality may be triggered through aggregated engagements on the messaging platform. The UAV may include a display screen and/or a microphone to provide for telepresence or interview functionality.

20 Claims, 7 Drawing Sheets

Related U.S. Application Data continuation of application No. 14/738,057, filed on Jun. 12, 2015, now Pat. No. 9,599,985.

(60) Provisional application No. 62/012,202, filed on Jun. 13, 2014.

(58) Field of Classification Search
USPC .......................................................... 701/2
See application file for complete search history.

(56) References Cited

U.S. PATENT DOCUMENTS

| | | | |
|---|---|---|---|
| 8,751,159 B2 | 6/2014 | Hall | |
| 9,234,757 B2* | 1/2016 | Skaaksrud | G06Q 10/0835 |
| 9,599,985 B2* | 3/2017 | Wang | G05D 1/0022 |
| 9,984,348 B2* | 5/2018 | Skaaksrud | H04W 4/38 |
| 10,698,401 B2* | 6/2020 | Wang | G05D 1/0022 |
| 10,762,466 B2* | 9/2020 | Skaaksrud | H04W 12/08 |
| 2002/0149617 A1 | 10/2002 | Becker | |
| 2006/0022986 A1 | 2/2006 | LinneVonBerg et al. | |
| 2006/0197835 A1 | 9/2006 | Anderson et al. | |
| 2006/0206351 A1* | 9/2006 | Hodges | G06Q 50/265 |
| | | | 705/325 |
| 2008/0248815 A1 | 10/2008 | Busch | |
| 2009/0087029 A1 | 4/2009 | Coleman et al. | |
| 2009/0276250 A1* | 11/2009 | King | G06Q 10/107 |
| | | | 707/E17.014 |
| 2010/0118147 A1 | 5/2010 | Domeich et al. | |
| 2012/0050524 A1 | 3/2012 | Rinner et al. | |
| 2012/0069131 A1 | 3/2012 | Abelow | |
| 2012/0274775 A1 | 11/2012 | Reiffel | |
| 2014/0018976 A1 | 1/2014 | Goossen et al. | |
| 2014/0024999 A1 | 1/2014 | Levien et al. | |
| 2014/0032034 A1 | 1/2014 | Raptopoulos et al. | |
| 2014/0067162 A1 | 3/2014 | Paulsen et al. | |
| 2014/0172194 A1 | 6/2014 | Levien et al. | |
| 2014/0277834 A1 | 9/2014 | Levien et al. | |
| 2014/0282016 A1* | 9/2014 | Hosier, Jr. | G06F 3/04883 |
| | | | 715/733 |
| 2014/0368601 A1 | 12/2014 | deCharms | |
| 2015/0154539 A1* | 6/2015 | Skaaksrud | G06Q 10/087 |
| | | | 705/333 |
| 2015/0227890 A1 | 8/2015 | Bednarek et al. | |
| 2015/0228004 A1 | 8/2015 | Bednarek et al. | |
| 2015/0234387 A1 | 8/2015 | Mullan et al. | |
| 2015/0336667 A1 | 11/2015 | Srivastava et al. | |
| 2015/0346722 A1 | 12/2015 | Herz et al. | |
| 2015/0362917 A1 | 12/2015 | Wang et al. | |
| 2016/0114887 A1 | 4/2016 | Zhou et al. | |
| 2016/0196525 A1 | 7/2016 | Kantor et al. | |
| 2016/0300492 A1 | 10/2016 | Pasko et al. | |
| 2016/0300493 A1 | 10/2016 | Ubhi et al. | |
| 2016/0345153 A1 | 11/2016 | Adams et al. | |
| 2017/0300757 A1 | 10/2017 | Wolf | |
| 2018/0008797 A1 | 1/2018 | Kozloski et al. | |
| 2018/0011484 A1 | 1/2018 | Wang et al. | |
| 2018/0066957 A1 | 3/2018 | Stroila et al. | |
| 2018/0091908 A1 | 3/2018 | Goel et al. | |
| 2018/0121876 A1 | 5/2018 | Doherty et al. | |
| 2018/0121877 A1 | 5/2018 | Doherty et al. | |
| 2018/0146216 A1 | 5/2018 | Chang et al. | |
| 2021/0192629 A1* | 6/2021 | Tofte | G06K 9/6215 |

OTHER PUBLICATIONS

Extended European Search Report in European Application No. 15806777.7, dated Jan. 3, 2018, 8 pages.

Lee et al., "Wireless Indoor Surveillance Robot", SICE Annual Conference, Sep. 13, 2011, pp. 2164-2169.

PCT International Preliminary Report on Patentability in International Application No. PCT/US2015/035610, dated Dec. 15, 2016, 8 pages.

PCT International Search Report and Written Opinion, PCT Application No. PCT/US2015/035610, dated Sep. 16, 2015, 11 pages.

Ungerleider, "Forget Selfies, Here Come 'Dronies' (Yes, It Means What You Think)," Fast Feed, May 21, 2014, 4 pages, [Online] [Retrieved on Aug. 28, 2015] Retrieved from the I nternet<URL: m.fastcompany.com/3030936/fast-feed/forget-selfieshere-come-dronies-yes-it-means-what-youthink?partner=rss&utm_source=feedburner&utm_medium=feed&utm_campaign=Feed%3A+fas tcompany%2Fheadlines+%28Fast+Company%29.

United States Office Action, U.S. Appl. No. 14/738,057, filed Sep. 8, 2016, 7 pages.

Extended European Search Report in European Application No. 21217641.6, dated Mar. 17, 2022, 9 pages.

Extended European Search Report in European Application No. 21189713.7, dated Nov. 24, 2021, 5 pages.

Extended European Search Report in European Application No. 20188326.1, dated Nov. 26, 2020, 6 pages.

* cited by examiner

MESSAGING-ENABLED UNMANNED AERIAL VEHICLE

CROSS-REFERENCE TO RELATED APPLICATION

This application is a continuation of U.S. application Ser. No. 15/421,672 filed Feb. 1, 2017, now allowed which is a continuation of U.S. application Ser. No. 14/738,057, filed Jun. 12, 2015, now U.S. Pat. No. 9,599,985, issued Mar. 21, 2017, which application claims the benefit of U.S. Provisional Application No. 62/012,202, filed Jun. 13, 2014, all of which are incorporated by reference in their entirety.

BACKGROUND

Online social media services, such as social networking sites, news aggregators, blogs, and the like provide a rich environment for users to comment on events of interest and communicate with other users. Social media account holders may capture and transmit certain facets of an event (e.g., a sporting event, a concert performance, an awards show, a festival, a competition) to followers of the event. These followers may be other account holders of social media networks who receive social media posts about an event to experience the event from the perspective of the social media account holders at the event. Generally, the followers receive posts from account holders that they are connected to or otherwise associated with. To receive adequate coverage of an event, followers assemble their own lists of followed account holders who are attending the event. If a follower is not connected to many followed account holders who are attending the event, then the follower may not receive adequate coverage of the event. Additionally, this configuration may be less than satisfying because the followed account holders may not capture the event in full detail due to issues such as inaccessibility to certain parts of an event or a lack of knowledge about occurrences at that event.

Followers of an event may also have access to an officially distributed feed of the event through a television, radio, or Internet stream of an event that provide more access or structure. However, these too can be lacking from a social media perspective as resource and cost constraints prevent wider coverage so that even an officially distributed feed lacks the multifaceted perspective that social media provides. Additionally, an officially distributed feed is generally not responsive to requests to cover different aspects of an event. Although followed account holders of social media that are attending an event may capture and transmit a different perspective on an event, their attention is focused mainly on the event rather than documenting the event for a wider range of followers, particularly, non-attendee followers who are account holders.

Additionally, most social media events are covered by followed account holders that are present at a particular observed moment of the event. However, these followed observers are constrained physically to where they are located and cannot capture a broader perspective on an event or quickly respond to requests to capture geographically dispersed aspects of an event, particularly as they occur in real-time. Hence, media coverage of events may be inadequate to satiate both followed and following account holders of social media services.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. ("Figure") 1 is a block diagram of an example real-time messaging platform, according to an embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

I. Configuration Overview

One example embodiment of a real-time messaging system, method, and non-transitory computer readable storage medium that includes account holders interacting with an unmanned aerial vehicle ("UAV") using a messaging platform. The UAV is autonomous or is piloted from a location remote from where the UAV is present. It is noted that while the descriptions herein are in the context of a UAV, the principles described may apply to other unmanned vehicles ("UV") such as remote controlled boats and cars.

In one example embodiment, the account holders receive media captured via the UAV and may submit commands for transmission to the UAV. Media captured by the UAV is received and incorporated into a message. The message including the captured media is broadcast to accounts of the messaging platform. Interactions related to the UAV are received from client devices of account holders. Based on these interactions related to the UAV, a command is determined for the UAV and transmitted to the UAV, which is configured to respond to the command.

The features and advantages described in the specification and in this summary are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

II. Real-Time Messaging Platform Overview

Figure 1:
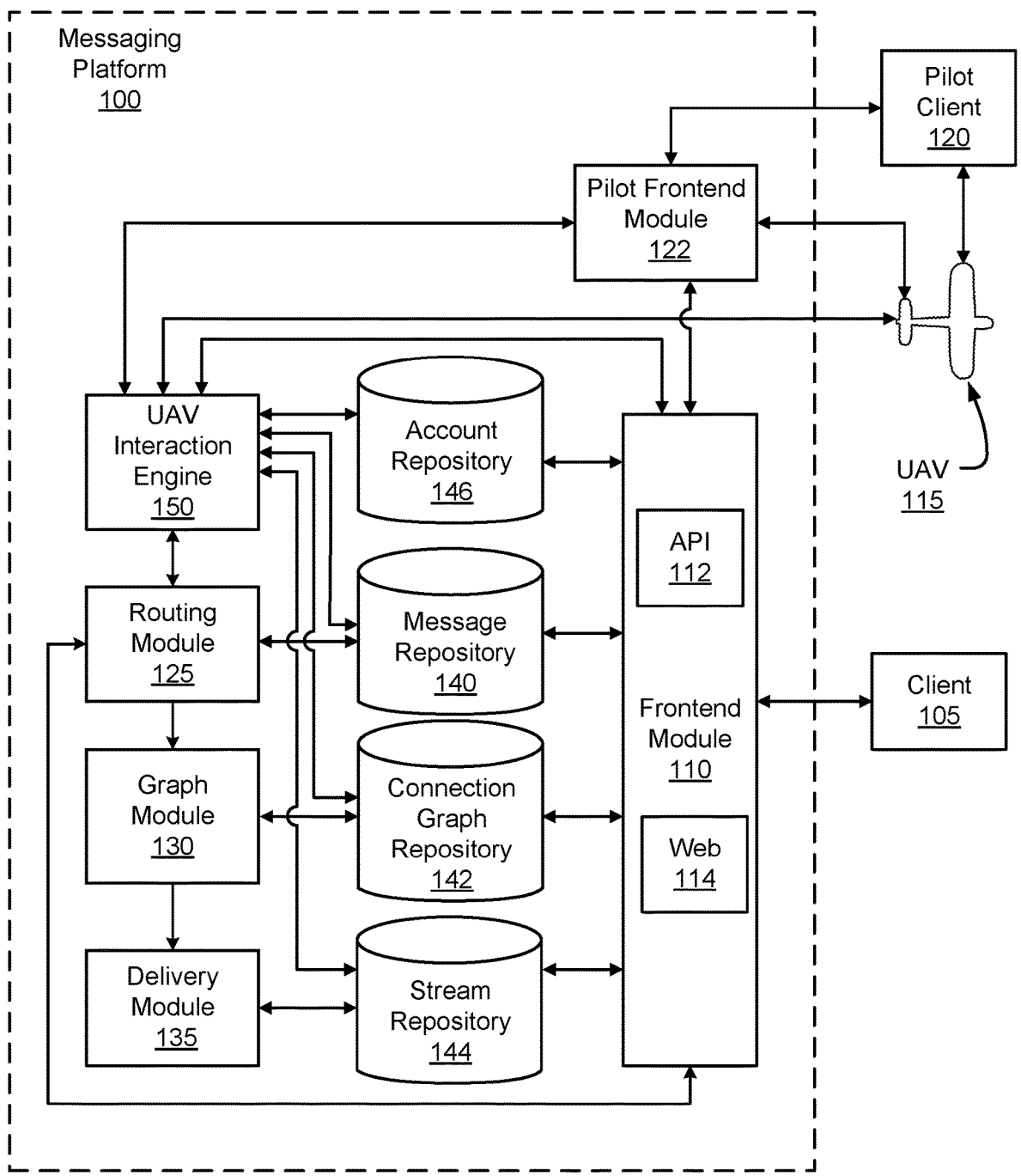

FIG. 1 is a block diagram of a real-time messaging platform 100, according to one embodiment. The real-time messaging platform 100 (also referred to as a "messaging platform") includes a frontend module 110, a pilot frontend module 122, a routing module 125, a graph module 130, a delivery module 135, a message repository 140, a connection graph repository 142, a stream repository 144, an account repository 146, and an unmanned aerial vehicle (UAV) interaction engine 150.

The messaging platform 100 allows account holders to create, publish, and view messages in a message stream visible to themselves and other subscribing accounts of the messaging platform 100. Account holders compose messages using a client software application running on a client computing device 105 (also referred to as a client 105 or a client device), such as a mobile phone, a tablet, a personal computer (laptop, desktop, or server), or a specialized appliance having communication capability. The client software application may include a web-based client, a Short Messaging Service (SMS) interface, an instant messaging interface, an email-based interface, or an API (application programming interface) function-based interface. The client computing devices 105 communicate with the messaging platform via a network. The network may communicate information through wired or wireless communication channels over a local-area network, a wide-area network such as the internet, or a combination thereof. The network may include multiple networks or sub-networks.

II. A. Message Composition With a Real-Time Messaging Platform

Messages are containers for a variety of types of computer data representing content provided by the composer of the message. Types of data that may be stored in a message include text (e.g., a 140 character "Tweet"), graphics, video, computer code (e.g., uniform resource locators (URLs)), or other content. Messages can also include key phrases (e.g., symbols, such as hashtag "#") that can aid in categorizing or contextualizing messages. Messages may also include additional metadata that may or may not be editable by the composing account holder, depending upon the implementation. Examples of message metadata include the time and date of authorship as well as the geographical location where the message was composed (e.g., the current physical location of the client 105).

The messages composed by one account holder may also reference other accounts. For example, a message may be composed in reply to another message composed by another account holder. Messages may also be repeats (or reposts) of a message composed by another account holder. Reposts may also be referred to as "retweets." Generally, an account referenced in a message may both appear as visible content in the message (e.g., the name of the account), and may also appear as metadata in the message. As a result, the messaging platform allows interaction with a referenced account in a message. For example, clients 105 may interact with account names that appear in their message stream to navigate to the message streams of those accounts. The messaging platform 100 allows messages to be private, such that a composed message will only appear in the message streams of the composing account and designated recipients' accounts.

The frontend module 110 receives composed messages from the clients 105, interfaces with other internal components of the messaging platform 100, and distributes message streams to account holders. The frontend module 110 may provide a variety of interfaces for interacting with a number of different types of clients 105. For example, when an account holder uses a web-based client 105 to access the messaging platform 100 (e.g., through an Internet browser), a web interface module 114 in the front end module 110 can be used to provide the client 105 access. Similarly, when an account holder uses an API-type client 105 to access the messaging platform 100 (e.g., through an application native to an operating system of the client 105), an API interface module 112 can be used to provide the client 105 access.

The routing module 125 stores newly composed messages received through the frontend module 110 in a message repository 140. In addition to storing the content of a message, the routing module 125 also stores an identifier for each message. This way, the message can be included in a variety of different message streams without needing to store more than one copy of the message.

II. B. Connections in a Real-Time Messaging Platform

The graph module 130 manages connections between account holders, thus determining which accounts receive which messages when transmitting message streams to clients 105. Generally, the messaging platform 100 uses unidirectional connections between accounts to allow account holders to subscribe to the message streams of other account holders. By using unidirectional connections, the messaging platform allows an account holder to receive the message stream of another account, without necessarily implying any sort of reciprocal relationship the other way. For example, the messaging platform 100 allows account holder A to subscribe to the message stream of account holder B, and consequently account holder A is provided and can view the messages authored by account holder B. However, this unidirectional connection of A subscribing to B does not imply that account holder B can view the messages authored by account holder A. This could be the case if account holder B subscribed to the message stream of account holder A; however, this would require the establishment of another unidirectional connection. In one embodiment, an account holder who establishes a unidirectional connection to receive another account holder's message stream is referred to as a "follower", and the act of creating the unidirectional connection is referred to as "following" another account holder. The graph module 130 receives requests to create and delete unidirectional connections between account holders through the frontend module 110. These connections are stored for later use in the connection graph repository 142 as part of a unidirectional connection graph. Each connection in the connection graph repository 142 references an account in the account repository 146.

In the same or a different embodiment, the graph module 130 manages connections between account holders using bidirectional connections between account holders. Upon establishing a bidirectional connection, both accounts are considered subscribed to each other's account message stream. The graph module stores bidirectional connections in the connection graph repository 142 as part of a social graph. In one embodiment, the messaging platform and connection graph repository 142 include both unidirectional and bidirectional connections.

II. C. Message Delivery With a Real-Time Messaging Platform

The delivery module 135 constructs message streams and provides them to requesting clients 105 through the frontend module 110. Responsive to a request for a message stream of a requested account holder, the delivery module constructs a message stream in real time. This may include providing messages from subscribed account holders who are mutually connected to the messaging platform during concurrent sessions (e.g., simultaneously). However, it may also include messages authored not in real time and/or via account holders that are not simultaneously connected to the messaging platform with the requesting account holder (also referred to as the contextual account holder). The contents of a message stream for a requested account holder may include messages composed by the requested account holder, messages composed by the other account holders that the requested account holder follows, messages authored by other account holders that reference the requested account holder, and in some cases advertisement messages selected by the messaging platform 100. The messages of the message stream may be ordered chronologically by time and date of authorship, or reverse chronologically. Other orderings may also be used.

There may be a large number of possible messages that might be included in the message stream. The delivery module 135 identifies a subset of the possible messages for inclusion in the message stream. For example, the delivery module 135 orders the subset of messages by time of composition or any other item of information available regarding the messages. The delivery module 135 stores the message stream in a stream repository 144. The stored message stream may include the entire contents of each of the messages in the stream, or it may include pointers that point to the location of the message in the message repository 140. The delivery module 135 provides the message stream to the requesting client 105 through the frontend module 110.

Clients 105 of the messaging platform 100 allow account holders to engage (e.g., interact) with the messages in message streams. There are a number of different types and categories of engagements (e.g., interactions). Types of engagement include clicking/selecting a message for more information regarding the message, clicking/selecting a URL (universal resource locator) or hashtag in a message, reposting the message, or favorite-ing, heart-ing, liking, up-voting, or down-voting a message. Other example engagement types include expanding a "card" message, which presents additional content when an account holder engages with the card message. Account holders may engage further with content contained in the expanded card message (e.g., playing a video or audio file, streaming a concurrently broadcast time-based media (TBM) event, voting in a poll).

The frontend module 110 allows account holders to manage their account with the messaging platform 100. The account holder can manage privacy, security, and advertising settings as well as directly manage their connections to other accounts. Generally, the messaging platform 100 does not require the account to contribute a large amount of personal information. The frontend module 110 allows the account holder to identify an account name (not necessarily a real) name, to provide pictures of media, or to provide a brief description of themselves/their entity, and to provide an affiliated website. However, the messaging platform 100 does not necessarily request or store traditional real-world identifying information such as age, gender, interests, history, occupation, etc. Instead, the messaging platform 100 is configured to infer information about the account holder based on the accounts they follow, the accounts that follow them, the messages they compose, and the messages they engage with. Any information explicitly provided or inferred about the account is stored in the account repository 146.

II. D. Real-Time Messaging Platform Interaction With a UAV

The real-time messaging platform 100 is communicatively coupled to a UAV 115, which is a flying vehicle that is remotely piloted (e.g., by a human pilot or autopilot) or that is substantially autonomous. One example UAV 115 is a rotor-based craft (e.g., a helicopter, a multi-rotor helicopter such as a quadcopter) that generates lift by using one or more rotors to accelerate air downwards. Alternatively or additionally, the UAV 115 is an aircraft that uses wings to generate lift. The UAV 115 is capable of communication with the messaging platform 100. For example, the UAV captures photographs or videos and transmits them to the messaging platform 100.

In one embodiment, the UAV 115 is controlled at least in part by a pilot using a pilot client 120 to input commands to the UAV 115. The pilot client 120 is generally a computing device similar to that used to implement the client 105, but the pilot client 120 includes software and/or hardware for controlling the movement of the UAV 115 as well as the function of additional devices mounted on the UAV. For example, the pilot client 120 controls the height and geographic position of the UAV 115 as well as lights, a camera, and speakers mounted thereon. In one embodiment, the pilot client 120 displays an UAV control interface generated by the pilot frontend module 122. The pilot inputs commands for the UAV 115 through the pilot frontend module 122, which transmits or relays these commands to the UAV 115. Alternatively or additionally, the pilot client 120 bypasses the pilot frontend module 122 when relaying commands to the UAV 115 (e.g., through a radio transmitter or other antenna). The pilot client 120 need not be a computing device. For example, the pilot client 120 may be a remote control having physical dials, buttons, switches, or levers that the pilot uses to input commands transmitted to the UAV 115 by an antenna. The UAV is further described with respect to FIG. 2.

The UAV interaction engine 150 provides for interaction between the UAV 115 and the messaging platform 100. In one embodiment, the UAV interaction engine 150 receives media captured by the UAV 115 and embeds the media in messages for delivery to accounts of the messaging platform 100. Media is a means for conveying information or meaning and includes images, videos, audio, animations, and text. For example, the UAV interaction engine 150 embeds a video stream from a camera on the UAV 115 in a card message authored by a UAV account (an account associated with the UAV 115). As another example, the pilot or messaging platform administrator creates messages containing images captured by the UAV 115 and authored by the UAV account.

The UAV interaction engine 150 may control the UAV 115 through one or more commands. A command is an instruction, order, or directive to the UAV 115 and may include a high-level goal (e.g., flying to a particular location, capturing video of a particular subject) or one or more low-level instructions (e.g., increasing a speed of a UAV rotor, rotating a UAV rotor, initiating capture with a camera on the UAV 115). The commands may be encoded in analog signals or digital signals transmitted to the UAV 115. As used herein, "controlling" the UAV 115 includes commands to the UAV 115 through the pilot or commands that the UAV 115 responds to without human intervention. For example, the UAV interaction engine 150 issues a command to the pilot through the pilot frontend module 122; in response to the command, the pilot controls the UAV 115 to accomplish a task. Such an arrangement avoids the UAV 115 executing objectionable commands (e.g., activating UAV-mounted loudspeakers during a speech at an event) and improves safety by providing a safeguard against commands that could crash the UAV 115. Example commands control UAV movement, control capture of media from a UAV-mounted camera, or control UAV-mounted speakers or lights. As another example, the UAV interaction engine 150 issues commands to the UAV 115, and a pilot supervises the UAV using the pilot frontend module 122 to prevent unsafe or otherwise objectionable actions by the UAV 115.

The UAV interaction engine 150 may provide for interaction between accounts of the messaging platform 100 and the UAV 115. In one embodiment, interactions or engagements by accounts with messages associated with the UAV 115 result in the UAV interaction engine 150 commanding the UAV 115 based on the interactions. For example, an account associated with the UAV 115 generates a message that includes selectable commands corresponding to different geographic locations. Based on interactions with these selectable commands, the UAV interaction engine 115 selects one of these geographic locations and commands the UAV 115 to fly to the selected geographic location. As another example, the UAV interaction engine 150 designates a promotional message as associated with the UAV. In this example, if enough accounts engage with the designated promotional message (e.g., by reposting it), then the UAV interaction engine 150 commands the UAV 115 to release a benign payload (e.g., confetti, flower petals, bubbles). The UAV interaction engine is further described in conjunction with FIG. 3.

III. Messaging-Enabled UAV

Figure 2:
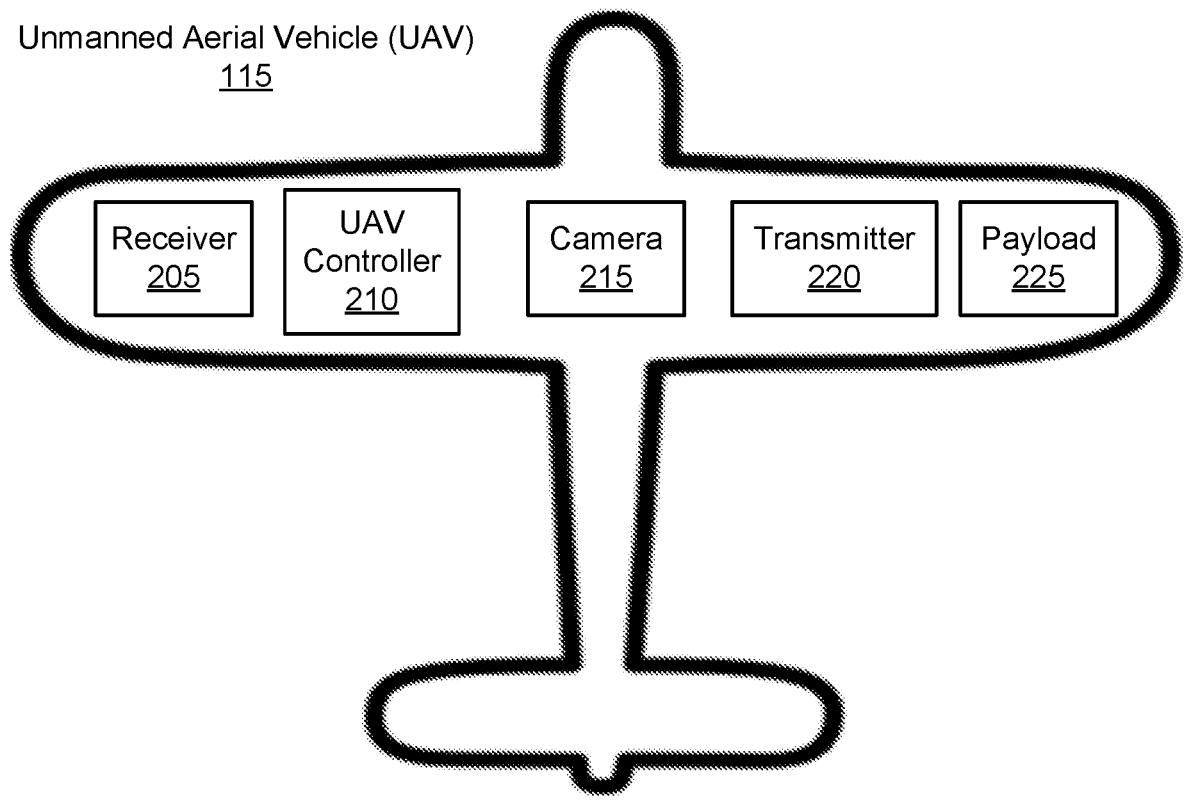
FIG. 2 is a block diagram of an example unmanned aerial vehicle (UAV), according to an embodiment.

FIG. 2 is a block diagram of an example UAV 115, according to an example embodiment. The UAV 115 includes a receiver 205, a UAV controller 210, a camera 215, a transmitter 220, and a payload 225. The UAV 115 also includes standard components of a flying vehicle. For example, if the UAV 115 is a quadcopter, the UAV 115 includes rotors, motors for providing torque to rotate the rotors, and shafts to convey the torque from the motors to the rotors. Using the rotors, the UAV 115 may accelerate air to propel itself through aerodynamic forces and modify its orientation through aerodynamic torques. The rotors may accelerate the UAV 115 vertically by accelerating air perpendicular to the ground, thereby providing a vertical aerodynamic force. Similarly, the rotors may accelerate the UAV 115 horizontally by accelerating air at an off-perpendicular angle to the ground to provide a horizontal aerodynamic force. To maintain or modify horizontal velocity, the UAV 115 may modify the orientation of its rotors relative to the ground to provide a component of horizontal force while maintaining vertical force to control the UAV's height. The UAV 115 includes means to steer itself as well as to modify the orientation (e.g., pitch, roll, yaw) of the UAV 115. For example, the motor applies differential power to rotate the rotors at different rates, thereby providing an aerodynamic torque to adjust the orientation of the UAV 115. As another example, the UAV 115 may adjust the axis of rotation of one or more rotors to affect the orientation of the UAV 115. In one embodiment, the UAV 115 includes counter-rotating rotors that lift the UAV 115 while providing opposing aerodynamic torques that cancel to maintain rotational stability of the UAV around the axis parallel to the rotation of the rotors. The UAV 115 may also include an electrical power source (e.g., a battery, solar panels) or a chemical power source (e.g., a fuel cell, a fuel tank and electrical generator engine) to power the motors and other components. The UAV 115 optionally includes structures to prevent damage to the UAV 115 upon landing (e.g., skids, wheels) or to prevent the rotors from colliding with another object (e.g., a cage enclosing the UAV 115).

The receiver 205 is an optional component for receiving communication from the pilot client 120 or the messaging platform 100 and generally receives commands to the UAV 115 as well as other data such as media or messages for presentation by the payload 225. The receiver 205 may be an antenna and accompanying electronic circuitry (e.g., an analog-to-digital converter, an amplifier, a noise-attenuating filter) to detect signals transmitted through electromagnetic signals (e.g., radio, WiFi, LTE).

The UAV controller 210 is an optional component to provide for digital or analog control of the UAV 115. The UAV controller 210 receives commands through the receiver 205 and directs the UAV 115 to adjust its position or orientation subject to the commands. The UAV controller 210 may also interface with a payload 225 to control the payload 225. In one embodiment, the UAV controller 210 is a computing device, and may optionally include a memory for storing media captured by the camera 215 or received through the receiver 205. The UAV controller 210 may monitor the status of the UAV 115, the camera 215, the payload 225, or itself and transmit status reports through the transmitter 220. The UAV controller 210 may include one or more sensors to measure the UAV's position, speed, and/or orientation, such as one or more global positioning system receivers, inertial measurement units, gyroscopes, magnetometers, pitot probes, or accelerometers.

In some embodiments, the UAV controller 210 may be a computing system that executes applications (e.g., mobile applications). The UAV controller 210 may download (or otherwise obtain), install, and execute applications. For example, the UAV controller installs an application to broadcast a video stream from the camera 215 to other computing devices executing the application substantially in real time, as described further below with respect to the application manager 325 of FIG. 3. The video stream may also be broadcast through interactive messages. The UAV controller 210 may execute multiple applications to interface with multiple types of applications on other computing devices. Applications on the UAV controller 210 may be downloaded, installed, removed, or updated in response to remote commands (e.g., from the pilot client 120 or other computing device associated with the messaging platform 100).

The camera 215 is an optional component to capture media from the environment around the UAV 115. In one embodiment, the camera 215 is a still and/or video-capable digital camera that includes an optical lens assembly to focus light, an image sensor (e.g., a charge-coupled device, an active-pixel sensor) that produces an electronic signal in response to light incident on the light sensor, and an aperture to limit light reaching the image sensor. The camera 215 may optionally include a microphone to capture audio or a memory to store captured media. The camera 215 may operate in response to commands from the pilot client 120 or the messaging platform 100, which may initiate or stop capture of media or may control focusing of an optical lens assembly. The camera 215 may include one or more mechanical actuators that modify the orientation or position of the camera 215 relative to the rest of the UAV 115.

The transmitter 220 is an optional component for sending communications from the UAV 115 to the pilot client 120 or the messaging platform 100. In one embodiment, the transmitter sends media captured by the camera 215 to the pilot client 120 (e.g., to facilitate control) or the messaging platform 100 (e.g., for inclusion in messages). The transmitter 220 may be an antenna and accompanying electronic circuitry (e.g., a digital-to-analog converter, an amplifier, a noise-attenuating filter, a power supply) to transmit data using electromagnetic signals. The transmitter 220 and receiver 205 may optionally be combined as a single component.

The payload 225 is an optional component to provide the UAV 115 with additional non-standard functionality. The payload 225 may be a droppable object that accelerates more slowly than gravity due to a low ratio of weight to cross-sectional surface area or that disperses over a wide area (e.g., snowflakes, sprinkles, flower petals, bubbles, candy, water, leaves, bacon bits, paper currency, raffle tickets). The payload 225 may also include a repository for droppable objects. The payload 225 may be a display device to display media received through the receiver 205 or stored in the UAV 115. For example, the payload 225 is a touchscreen to display a video feed (e.g., for a telepresence interview), or the payload 225 is a projector to display media (e.g., an advertisement) on proximate objects (e.g., a wall of a building, the ground, the side of a canyon). The payload 225 may be speakers or another electroacoustic transducer to play audio received from the receiver 205 or stored in the UAV 115 (e.g., music, an announcement, an advertisement, an audio file in a received message, a text-to-speech reading of a message). The payload 225 may be a lighting instrument (e.g., a spotlight, a laser, a beam projector, a gobo, a cucoloris) for creating a visual show. The payload 225 may be a sensor to gather data points. The sensor may be a temperature, pressure, or light sensor to gather meteorological data, or a radar or proximity sensor to avoid collisions with objects, for example.

IV. UAV Interaction Engine

Figure 3:
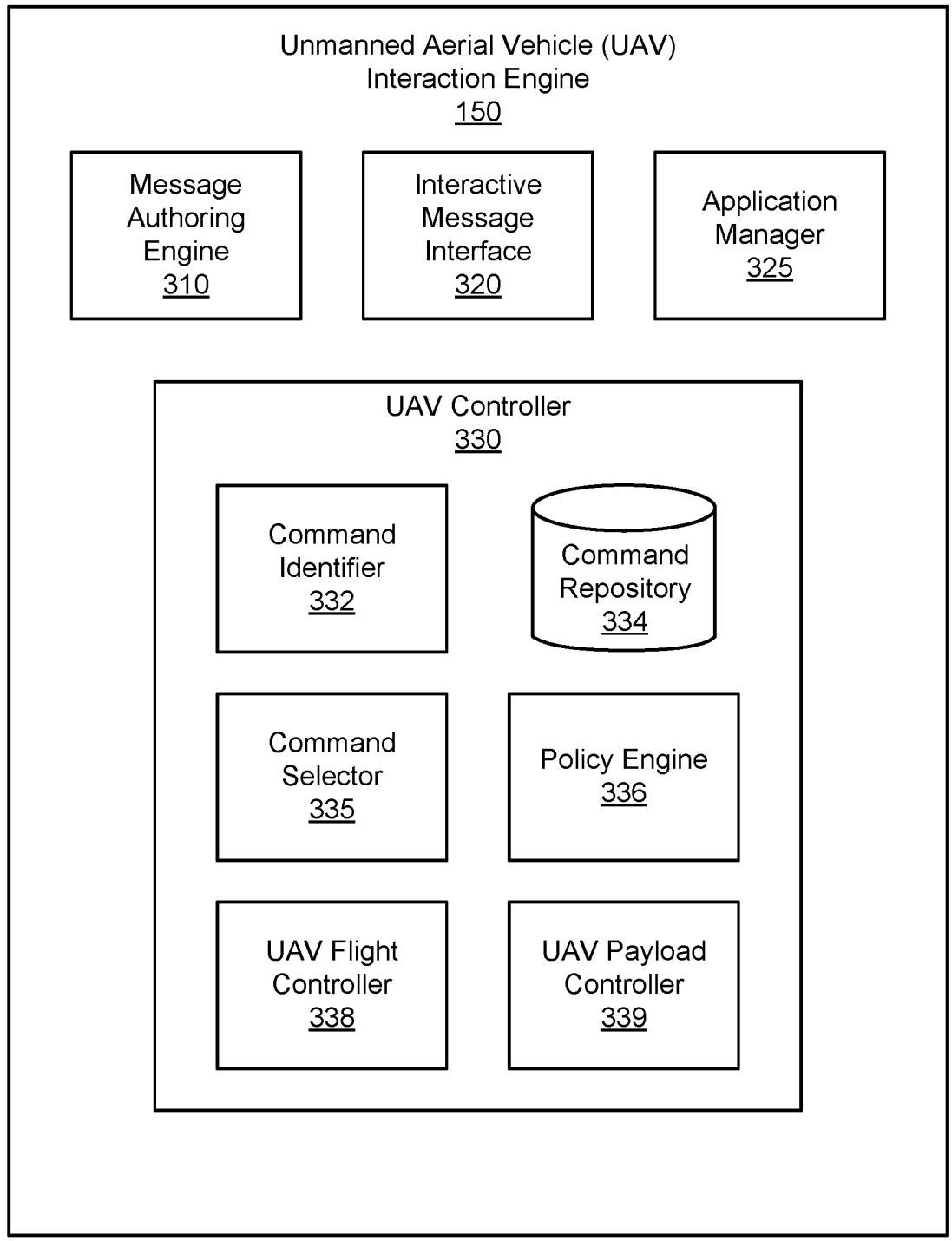
FIG. 3 is a block diagram of an example UAV interaction engine, according to an embodiment.

FIG. 3 is a block diagram of an example UAV interaction engine 150, according to an embodiment. The UAV interaction engine 150 includes a message authoring engine 310, an interactive message interface 320, an application manager 325, and a UAV controller 330. In other implementations, the functionality of the modules 310-350 may be split among different modules, which may implement additional functionalities or omit some of the described functionality. Furthermore, the functionality of each of the components 310-350 is optional; various embodiments may have different combinations of the features described herein. For clarity of description, generation of messages and interfaces incorporating media captured by the UAV 115 are discussed first, and control of the UAV 115 is described second.

IV. A. UAV Messages

The message authoring engine 310 creates messages using content captured by the UAV 115. In one embodiment, the message authoring engine 310 generates messages authored by one or more accounts associated with the UAV 115. The account may author messages containing pointers to a media item updated substantially in real time as the UAV interaction engine 150 receives media captured by the UAV 115. For example, the authored message is a card message that expands to play a stream of an event captured by the UAV. The messaging platform 100 may provide the captured media from the UAV 115 to an event organizer to place in messages authored by an account associated with the event. The pilot may view the captured media through the pilot frontend module 122 and maintain a UAV account associated with the UAV 115. The messages are broadcast to accounts of the messaging platform 100. In one embodiment, "broadcasting" a message includes releasing a message for placement in a message stream by the delivery module 135. Broadcasting a message may also include publishing the message to any account holder or multicasting the message to a subset of account holders (e.g., consistent with privacy settings of the message's authoring account) or to a single account holder. The message authoring engine 310 may even transmit media captured by the UAV 115 for presentation through traditional media (e.g., television, radio).

The message authoring engine 310 may automatically select media captured by the UAV 115 for incorporation in messages. For example, the message authoring engine 310 identifies messages that include media and that are authored by users attending an event at which the UAV 115 is present (determined based on a location associated with the message). The message authoring engine 310 ranks the identified messages based on engagements (e.g., re-transmissions, selections as favorites) to determine popular media. The message authoring engine 310 then selects media captured by the UAV 115 that is similar to the images in the highest-ranked messages (e.g., using image or audio processing to identify similar audio or images) and incorporates the selected images into messages. Thus, the message authoring engine 310 incorporates media captured by the UAV 115 into messages broadcast by the messaging platform 100.

The interactive message interface 320 presents an interactive message that includes content that updates with the progression of the event that the UAV 115 is covering. For example, the interactive message interface 320 includes a real-time video or audio stream captured by the UAV 115, or a live blog, stream, or slideshow including images captured by the UAV 115. The interactive message interface 320 may also include selectable options for an account to interact with the UAV 115. The selectable options may be commands corresponding to movement instructions for the UAV 115 to change its physical position, orientation, velocity, or rate of rotation about an axis of the UAV. For example, the selectable options of the interactive message interface 320 correspond to different locations at an event (e.g., different stages at a music festival) at which the UAV 115 may capture media.

As another example, an account holder may instruct the UAV 115 to do a barrel roll maneuver using a selectable option of the interactive message interface 320. The selectable options may be commands corresponding to instructions for the camera 215 to modify at least one of its orientation, position relative to the other components of the UAV 115, or its subject. For example, some of the selectable options correspond to pointing the camera at the ground and pointing the camera at the sky. The subject of the camera 215 is a person or object that the camera 215 captures. For example, different selectable options correspond to different celebrities at an awards show. If the goal for the UAV 115 is a camera subject rather than a UAV position 115, then the pilot directs the UAV 115 to capture the subject from multiple perspectives and to track the subject if the subject moves. Hence, the interactive message interface 320 provides for interaction between the UAV 115 and accounts of the messaging platform 100.

The application manager 325 provides data (e.g., captured media, location, speed) from the UAV 115 to one or more mobile applications native to an operating system of a mobile device (or other computing system). The application interface 325 also receives interactions, engagements, and other feedback from the mobile applications. For example, the application includes a video stream that presents video substantially in real time as the camera 215 captures the video. The application may provide one or more interactions options for the UAV 115. For example, the application detects an approval signal regarding the UAV's current location and/or camera subject when the application detects a tap or other pressure on a touchscreen of the computing device. The tap may be in a particular region of the touchscreen (e.g. an interface object, the video stream) or any region of the touchscreen (e.g., in full-screen video mode). As another example, the application may include interface objects (e.g., buttons, images, words) selectable to vote for a particular location or subject (or to provide low-level commands to the UAV such as ascend, descend, or move forward). The application may present interface messages or any of the elements of interactive messages.

The application manager 325 may support multiple data streams from multiple cameras 215 on one or more UAVs 115. For example, different cameras 215 correspond to different streams within the mobile application. The application manager 325 receives interactions from the multiple streams, associates the interaction with the relevant UAV 115 and camera 215, and provides the interaction to the UAV controller 330 to control the relevant UAV 115 and/or camera 215. Furthermore, the application manager 325 may provide the UAV data to multiple types of applications, which may present media captured by the UAV 115 in different interfaces and collect different types of interactions with the media captured by the UAV 115. Besides supporting applications for mobile devices, the application manager 325 may also support web applications for browsers, where the web applications provide similar functionality to mobile applications and/or interactive messages.

IV. B. UAV Control

The UAV controller 330 determines commands for transmission to the UAV 115 based on interactions related to the UAV 115. The UAV controller 330 includes a command identifier 332, a command repository 334, a command selector 335, a policy engine 336, a UAV flight controller 338, and a UAV payload controller 339. The UAV controller 330 identifies commands using the command identifier 332, determines which commands to execute using the command selector 335, determines whether selected commands are permissible using the policy engine 336, and implements the commands using the UAV flight controller 338 or the UAV payload controller 339. In other embodiments, the functionality of the UAV controller 330 may partition functionality between a different set of modules, omit some functionality, or include additional functionalities from those described herein.

The command identifier 332 identifies from commands received through the messaging platform 100. In one embodiment, the command identifier identifies explicit commands received through the interactive message interface 320. For example, the interface 320 includes selectable commands for the UAV 115 such as flying to a location, capturing media portraying a particular subject, or triggering a UAV payload 225. Alternatively or additionally, the interactive message interface 320 includes a video feed embedded in a message that a user may interact with to command the UAV 115 or to command the camera 215 thereon. For example, the account holder swipes across a touchscreen in a region displaying the video feed to pan the camera 215, or the account holder taps the touchscreen in the region displaying the video feed to instruct the camera 215 to zoom towards the tapped location of the video feed. As another example, a user may instruct the UAV 115 to fly to a location depicted in media or to track a subject depicted in media by selecting the location or the subject in media displayed in the interactive message interface 320. Besides using a touchscreen, the user may use other input devices (e.g., a mouse, a keyboard, a joystick, a gesture-sensing camera) to select the subject displayed in the interactive message interface 320. Alternatively or additionally, the interactive message interface 320 includes voice commands. For example, the interface message interface 320 includes a selectable option to input a voice command. Upon selection of the voice command option, the interactive message interface 320 records audio including the voice command, which may then by analyzed by a speech-to-text algorithm to identify a command.

Besides receiving inputs from the interactive message interface 320, the command identifier 332 may determine commands from messages authored by accounts. In one embodiment, the command identifier 332 consults a command repository 334 to determine whether a message contains a valid command to the UAV 115. For example, the command identifier 332 recognizes commands embedded in text of the message (e.g., "lower," "higher," "loop de loop," "go to the red carpet"). The command repository 334 includes entries for valid commands as well as different text or other message media corresponding to a given commands in a lookup table or other suitable data structure. For example, an entry in the command repository 334 for a command to increase the speed of the UAV may recognize "quicker," "speedy," "faster," or "rapidly" as valid text to call a command. The command identifier 332 may include optical character recognition to recognize commands in images or videos of message content, and the command identifier 332 may also include speech-to-text processing to recognize commands embedded in audio in messages. In one embodiment, the command identifier 332 identifies commands from special characters preceding, succeeding, or bracketing text in a message (e.g., "#up," "*fast*"). The command repository 334 may include the special characters as well as rules for recognizing commands associated with the special characters.

The command identifier 332 may ascertain whether messages from the message platform 100 pertain to the UAV 115 prior to identifying commands. In one embodiment, the command identifier 332 analyzes messages directed towards a UAV account associated with the UAV 115 for the possibility of including commands. For example, authors of accounts may control the UAV 115 using the content of messages directed towards the UAV account. Alternatively or additionally, the command identifier 332 identifies messages containing identifiers associated with a UAV 115 prior to identifying commands in a message. The command identifier 332 may consult the command repository 334 to determine whether a message contains a command and which UAV 115 the command refers to. For example, the identifier is preceded, succeeded, or bracketed by special characters. In an example message containing the text "let's see some Future Islands #CoachellaUAV #FlyGobiStage," the text "#CoachellaUAV" is an identifier indicating the message is intended as a command for a UAV 115 at Coachella, and the text "#FlyGobiStage" indicates that the message is a command for the UAV 115 at Coachella to fly to the Gobi stage (where Future Islands is presumably playing). In one embodiment, the command identifier 332 identifies commands that appear to be directed towards the UAV 115, but are not valid commands in the command repository 334. In response, the command identifier 332 may communicate (e.g., through a message, through the interactive message interface 320) that a command is not valid, provide information about valid commands, and/or suggest a valid command similar to an invalid command submitted from an account.

Using identified commands, the command selector 335 selects a command for the UAV 115 to execute. This command selector 335 is an optional component; for example, the UAV controller 330 transmits identified commands in real time as they are received provided they are valid and/or permissible. In one embodiment, the command selector 335 determines a command for the UAV 115 from a most numerous or popular identified command. For example, the command selector 335 counts the number of interactions corresponding to different commands received during a time period. At the end of the time period, the command selector 335 determines the command for the UAV 115 from the command having the highest number of interactions corresponding to the chosen command. Such a control mode provides for a democratic method of determining a command for the UAV 115. For example, the commands correspond to locations, and the command selector 335 selects the location receiving the most interactions and commands the UAV 115 to fly to that selected location.

As another example, the interactions are approval signals (e.g., hearts, favorites, up-votes, likes), and the command selector 335 uses the approval signals to determine a location for the UAV 115 or a subject for the camera 215. For example, the command selector 335 initially selects locations to move the UAV 115 along a predetermined path (e.g., a series of locations). The command identifier 332 receives approval signals and associates each signal of approval with the location of the UAV 115 (or the subject of the camera 215) according to timestamps of the approval signals. In response to one of the locations receiving more than a threshold number of approval signals (within a predetermined time period), the command selector 335 instructs the UAV 115 to fly to the location and maintain position at the location. If the number of approval signals within a recent time period no longer exceeds a threshold amount, the UAV 115 may resume flying to other locations.

As another example, the command selector 335 initially cycles through a number of subjects being captured by the camera in real-time (and, optionally, that have been programmatically identified and selected through image recognition resources either on the UAV or network accessible to the UAV). Once a number of approval signals (within a time period) exceeds a threshold when the camera 215 is oriented towards a particular subject, then the command identifier 332 instructs the camera 215 to maintain focus on the subject and keep the subject within view of the camera (for example, in the center of the camera's line of sight) until the number of approval signals within a recent time period no longer exceeds the threshold. The threshold number of approval signals for selecting a location or subject may be different (e.g., higher) than the threshold number of approval signals for resuming a rotation of locations or subjects or otherwise selecting a different subject or location.

In one embodiment, the command selector 335 selects a command in response to a command receiving an aggregate number of interactions (through the messaging platform 100) equaling or exceeding a threshold number of interactions. The interactions qualifying for purposes of meeting the threshold may have to meet certain criteria. The criteria for the interaction specify one or more types of interactions that qualify to meet the threshold and any characteristics of the interactions to meet the threshold. For example, the criteria indicate that qualifying interactions are reposts of a message associated with an account of the event organizer. In this example, reposting is the type of interaction and the characteristics of the interaction are the message from the account of the event organizer. Other characteristics of a message besides the authoring account may include an attribute of the account holder engaging in the interaction (e.g., location, demographics, language spoken), secondary responses to the interaction (e.g., a minimum number of further reposts of a repost interaction), or a time interval for the interaction. As another example, an account associated with the UAV 115 issues a challenge to repost an advertisement message of a charity. In this example, if more than a predetermined number of accounts repost the advertisement message, then the command selector 335 selects commands (through the UAV payload controller 339) for the UAV 115 to drop t-shirts and to activate onboard disco lights. Thus, a collective number of interactions by accounts of the messaging platform may trigger the command selector 335 to determine a command.

In some embodiments, the UAV 115 may be one of multiple UAVs 115 flying in close physical proximity to one another (e.g., at the same outdoor festival or event). In such an embodiment, the command selector 335 may determine commands for a UAV 115 based on the location, camera subject, or other attributes of the other UAVs 115 in proximity. For example, the command selector 335 deploys the UAVs 115 to different locations at least a threshold distance away from each other. As another example, the command selector 335 instructs the cameras 215 to focus on different subjects.

To determine the location and/or subjects for the respective UAVs 115, the command selector 335 may rank locations and/or subjects according to scores corresponding to a number of approval signals or other positive interactions directed at the respective locations and/or subjects. The scores may be determined based on a time-decay factor for the different interactions or some other weighting. For example, interactions from users within a threshold distance of one or more of the UAVs 115 receive higher weighting than interactions from users not within the threshold distance. The command selector 335 selects a number of locations and/or subjects according to the ranking and the number of UAVs 115 (for locations) and cameras 215 (for subjects). The command selector 335 then assigns each of the selected locations and/or subjects to a UAV 115 to reduce or substantially minimize differences in position between each UAV 115 and its assigned location and/or subject.

Before transmitting an identified or selected command to the UAV 115, the policy engine 336 may determine whether a command is advisable, appropriate, legal, safe, and otherwise unobjectionable. In one embodiment, the policy engine 336 enforces physical location boundaries on the UAV 115. For example, the policy engine 336 obtains a location boundary restricting movement of the UAV 115 to a given physical space or excluding the UAV 115 from a physical space (e.g., defined by one or more heights above ground, altitudes, or geographic locations or boundaries). These location boundaries may be based on government aviation rules for UAVs 115, areas with public events, or some other legal framework, for example. The location boundaries may be received from the event organizer. The policy engine 336 determines whether the command would result in the UAV traversing or violating the location boundary. If so, then the policy engine 336 may prevent the UAV controller 330 from transmitting the command or modify the command to prevent the UAV 115 from traversing the boundary. For example, if a command directs a UAV 115 to fly below a minimum permissible height, then the UAV flight controller 338 commands the UAV 115 to fly at the minimum permissible height. The policy engine 336 may also include additional policies to ensure safety or etiquette such as policies to ensure that the UAV 115 maintains a minimum distance away from persons or objects. The UAV 115 may determine the minimum distance through a proximity sensor, and/or the policy engine 336 includes image processing capabilities to estimate distance to a subject of a captured image, animation, or video.

The policy engine 336 may enforce various policies determined by administrators of the messaging platform 100 or accounts thereof associated with organizers of an event at which the UAV 115 is flying. In addition to location boundaries, example policies might dictate how long the UAV 115 may linger at a particular location, may capture media about a given subject, or when the UAV 115 may execute commands controlling a payload 225. For example, the policy engine 336 may prevent execution of commands to release a payload 225 before a threshold time and/or may restrict dropping the payload only in a particular geographic location or only outside of a graphic area. As another example, the policy engine 336 may prevent capture of media from certain locations at an event to ensure privacy. Thus, the policy engine 336 enforces deterministic rules to ensure appropriate behavior of the UAV 115. The policy engine 336 may enforce policies on the orientation of the camera 215 to restrict capture of media only to public events (e.g., festivals, concerts) and prevent capture of media pertaining to private areas.

From commands selected by the command selector 335 and/or determined to be permissible by the policy engine 336, the UAV flight controller 338 handles commands regarding movement of the UAV 115 or control of the camera 215. For example, commands to the UAV 115 from the flight controller 338 control movements by specifying a physical position, geographic location, an orientation, a velocity, a height, a rate of rotation about an axis through the UAV 115, or acceleration of the UAV 115. As another example, the commands to the UAV 115 modify an orientation, position, or subject of the camera 215. The commands from the UAV flight controller 338 may additionally instruct the camera 215 to capture an image, begin recording media, or stop recording media. The UAV flight controller 338 may communicate with an autopilot operating on the UAV 115 (e.g., the UAV controller 210) to execute a command and/or may instruct the pilot to execute a command via the pilot client 120.

When the command specifies, (e.g., based on real-time or near-time indications of interactions), a target subject for the camera 215, the UAV flight controller 338 may use suitable image processing techniques (e.g., edge matching, color matching, gradient matching) to detect the target subject in UAV-captured media. The UAV flight controller 338 may modify the camera to keep the subject in view (e.g., in the center of captured video and in focus). For example, if the UAV flight controller 338 determines non-zero motion of a detected subject by comparing the position of the detected subject in successively captured video frames or images, then the UAV controller 338 adjusts the motion of the camera 215 to cancel the detected motion of the subject. Similarly, if the command specifies a location, the UAV flight controller 338 determines commands for the UAV 115 to fly to the location or maintain a position at the location. The UAV flight controller 338 may use feedback from onboard sensors to counter the effect of destabilizing forces (e.g., wind) on the UAV's position or the camera's orientation. The command selector 335 may output a command specifying a location and a subject. Accordingly, the UAV flight controller 338 commands the UAV 115 to fly to the specified location (or hover at the specified location) while maintaining the camera's focus on the specified subject.

The UAV payload controller 339 handles commands regarding operation of the payload 225. As described previously, the payload 225 may be droppable, may present media received from the messaging platform 100 (e.g., through a display device, a loudspeaker), may provide entertainment (e.g., lighting instruments), or may collect data (e.g., a temperature sensor). The UAV payload controller 339 may command the UAV 115 to release the payload 225, to play media, to cease playing media, to begin a light show, or to end a lightshow in response to interactions described previously. For example, the payload controller releases a payload or begins playing a video on a UAV-mounted screen in response to a command from the command selector 335. As another example, the command identifier 332 identifies commands corresponding to different songs, the command selector 335 determines a song having the most number of accounts requesting the song, and the UAV payload controller 339 instructs the UAV to play the selected song through UAV-mounted loudspeakers. The UAV payload controller 339 may communicate with an autopilot operating on the UAV 115 (e.g., the UAV controller 210) to operate a payload 225 and/or may instruct the pilot to operate the payload 225 via the pilot client 120. Hence, the UAV payload controller 339 provides attendees of an event an incentive to engage with the messaging platform 100.

V. UAV Control Through Broadcast UAV Messages

Figure 4:
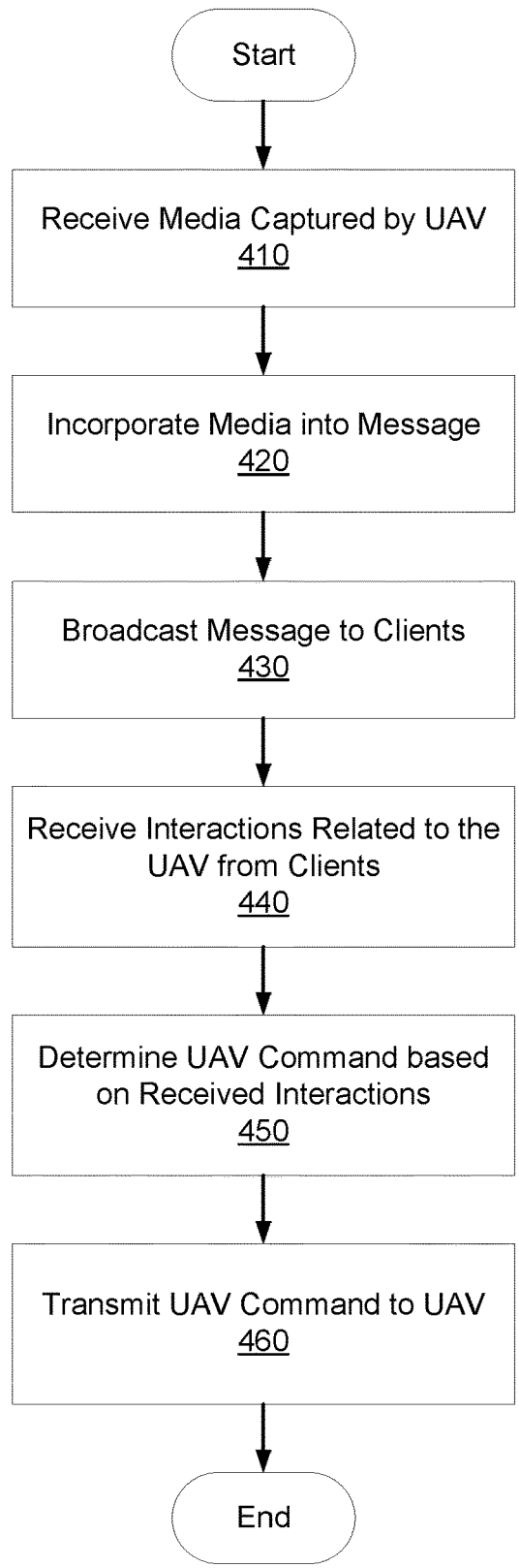
FIG. 4 is a flowchart of an example method for using messages to interact with a UAV, according to an embodiment.

FIG. 4 is a flowchart of an example method for using messages to interact with a UAV 115, according to an embodiment. The UAV interaction module 150 receives 410 media captured by the UAV 115. The message authoring engine 310 or the interactive message interface 320 incorporates 420 the captured media from the UAV 115 into a message (or an interface of the messaging platform 100). Incorporating the media into the message may include inserting a point to the media for example. By selecting the pointer, a recipient of the message may view a feed of the media that is updated substantially in real time. The message may also include selectable commands for the UAV 115. The delivery module 135 broadcasts 430 the message incorporating the captured media to other accounts of the messaging platform 100.

The UAV interaction module 150 receives 440 interactions related to the UAV 115. The interactions may include interactions with the broadcast message incorporating the captured media or incorporating selectable commands for the UAV 115. The interactions may include messages directed towards an account associated with the UAV 115, or the interactions may include interactions with an account or message not explicitly associated with the UAV 115 but nonetheless related as part of a promotion or an event. The UAV controller 330 determines 450 a command for the UAV 115 based on the received interactions related to the UAV 115. To determine the command, the message identifier 332 may identify commands embedded in messages or corresponding to other interactions related to the UAV 115. To determine the command, the message selector 335 may select a command from identified commands, and optionally the policy engine 336 determines whether the identified commands or selected command is permissible. The command may control movement of the UAV 115 or may control a camera 215 or payload 225 on the UAV 115. The message selector 335 may determine the command based on numbers of interactions corresponding to different types of commands or may include selecting the command based on an aggregate number of interactions equaling or exceeding a threshold, where the interactions meet a given criteria (e.g., an interaction type, with a particular message, with a particular account). The UAV flight controller 338 or the UAV payload controller 339, as appropriate, transmits the command to the UAV 115, which is configured to respond to the command by modifying flight of the UAV 115 or operating the camera 215 or the payload 225. Transmitting the command may include transmitting the command to a pilot to execute the command using a pilot client 120. Hence, accounts of a messaging platform 100 may receive media captured by a UAV 115 and influence the UAV 115.

VI. Interactions With a UAV Through UAV Messages

Figure 5:
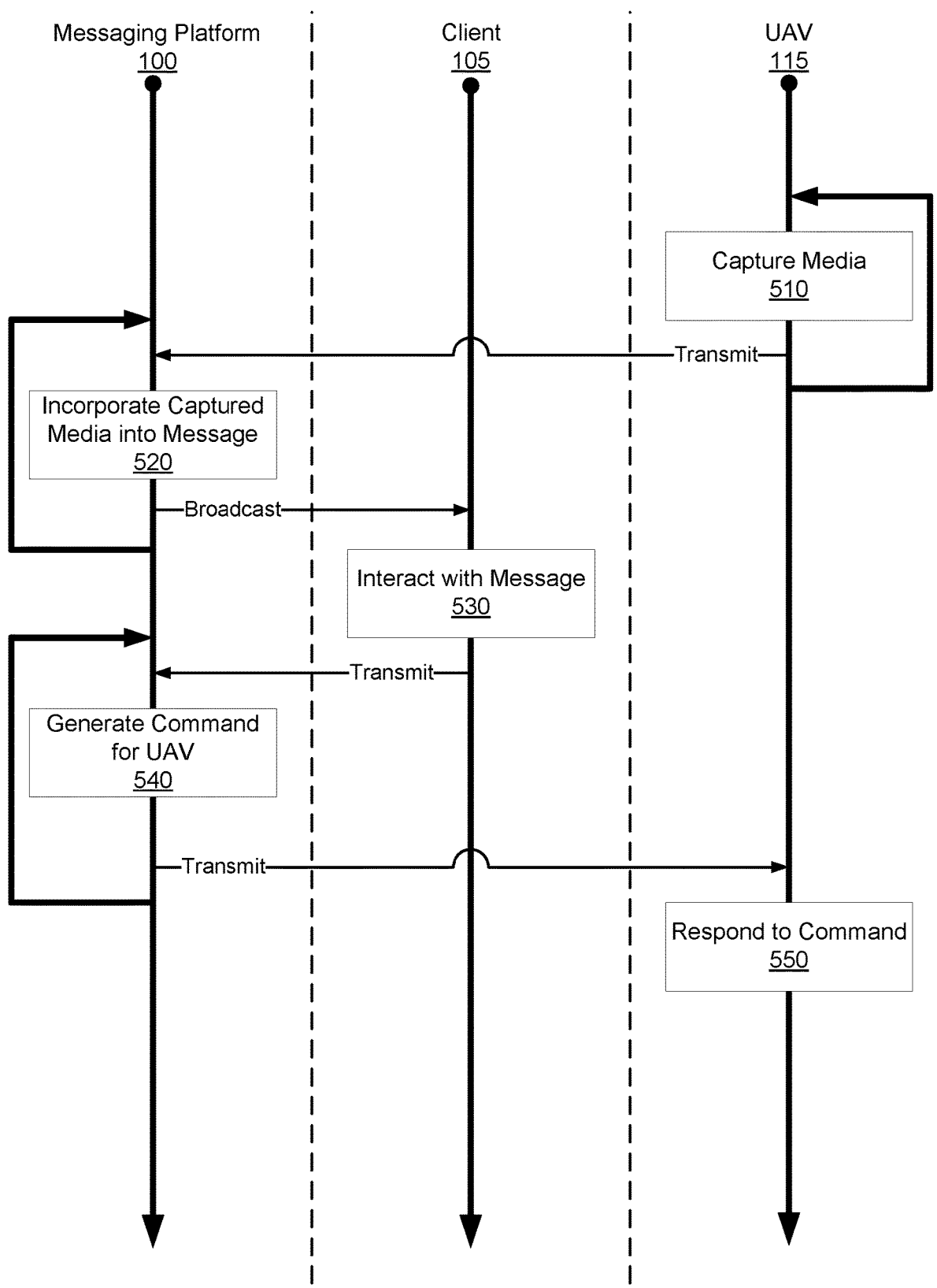
FIG. 5 is an interaction diagram illustrating an example flow of information between the messaging platform, client, and the UAV, according to an embodiment.

FIG. 5 is an interaction diagram illustrating an example flow of information between the messaging platform 100, clients 105, and the UAV 115, according to an embodiment. A UAV 115 captures 510 media and transmits the media to the messaging platform 100. The media may be captured repeatedly and transmitted continuously (or in packets). The UAV interaction module 150 incorporates 520 the captured media into messages or other interfaces of the messaging platform 100. These messages (or other interfaces) are broadcast to client devices 105 for viewing by account holders. The UAV interaction module 150 may repeatedly generate new messages or update broadcast messages substantially in real time with receiving the captured media. An account holder may interact 530 with a message pertaining the UAV 115 through the client 105 by selecting a command for the UAV 115. The client 105 transmits the interaction including the selected command to the messaging platform 100. Based on the received interaction (and interactions from other clients 105), the UAV interaction module 150 generates 540 a command for the UAV and transmits this command. The messaging platform 100 may repeatedly generate 540 commands; for example, at a regular rate. The UAV 115 receives the commands and responds 550 to the command.

VII. Computing Machine Architecture

Figure 6:
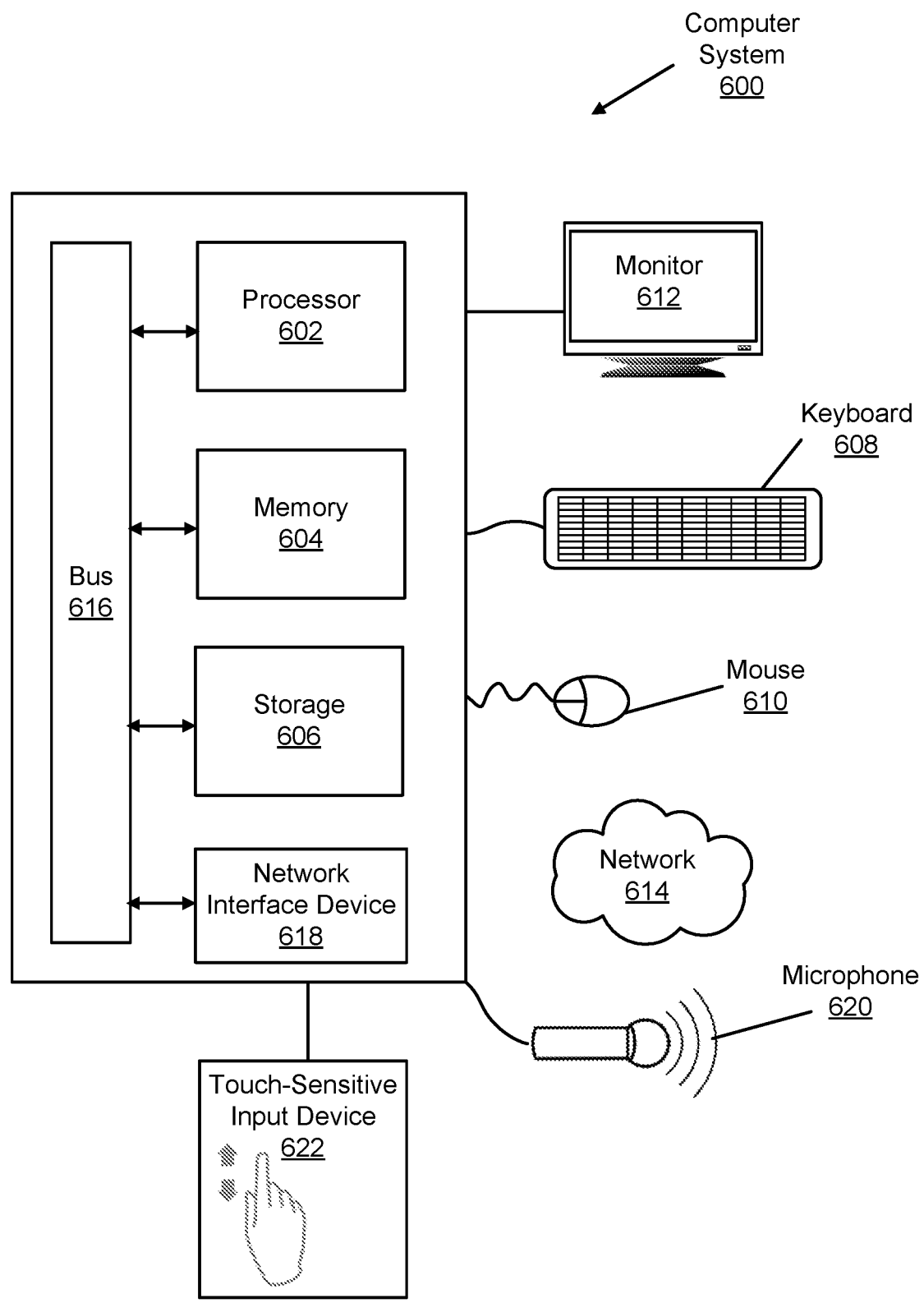
FIG. 6 illustrates components of an example machine able to read instructions from a machine-readable medium and execute them in a processor (or controller), according to one embodiment.

FIG. 6 illustrates components of an example machine able to read instructions from a machine-readable medium and execute them in a processor (or controller), according to one embodiment. Specifically, FIG. 6 shows a diagrammatic representation of a machine in the example form of a computer system 600 within which instructions (e.g., software) for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet, a set-top box (STB), a smart phone, a web appliance, a network router, switch or bridge, or any machine capable of executing instructions (sequential or otherwise) that specify actions to be taken by that machine. For example, the client 105 is implemented as a smart phone, the messaging platform 100 is implemented as a server, and the pilot client 120 is implemented as a laptop, but these may be implemented by other computer systems 600. Further, while only a single machine is illustrated, the term "machine" shall also be taken to include any collection of machines that individually or jointly executes instructions to perform any one or more of the methodologies discussed herein.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory (or storage) 606, which are configured to communicate with each other via a bus 616. The computer system 600 may further include graphics display unit (or monitor) 612 (e.g., a plasma display panel (PDP), a liquid crystal display (LCD), a projector, or a cathode ray tube (CRT)). The computer system 600 may also include an alphanumeric input device 608 (e.g., a keyboard), a cursor control device 610 (e.g., a mouse, a trackball, a joystick, a motion sensor, or other pointing instrument), and a network interface device 618 (e.g., a network adapter), which also are configured to communicate via the bus 616.

The computer system 600 may include input devices such as a microphone 620 or other audio input device for recording audio snippets or otherwise converting sound waves to electrical signals. The computer system 600 may also include a touch-sensitive input device 622 (e.g., a touchscreen, a projected keyboard, an interactive surface), which may be integrated with the display unit 612. Various implementations may omit components of the example computer system 600; for example, the messaging platform 100 omits the microphone 620 and the touch-sensitive input device 622.

The storage 606 includes a machine-readable medium on which are stored instructions embodying any one or more of the methodologies or functions described herein. The instructions (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions may be transmitted or received over a network 614 via the network interface device 618.

While machine-readable medium is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium that is capable of storing instructions for execution by the machine and that cause the machine to perform any one or more of the methodologies disclosed herein. The term "machine-readable medium" includes, but not be limited to, data repositories in the form of solid-state memories, optical media, and magnetic media.

VIII. Example UAV Configuration

Figure 7:
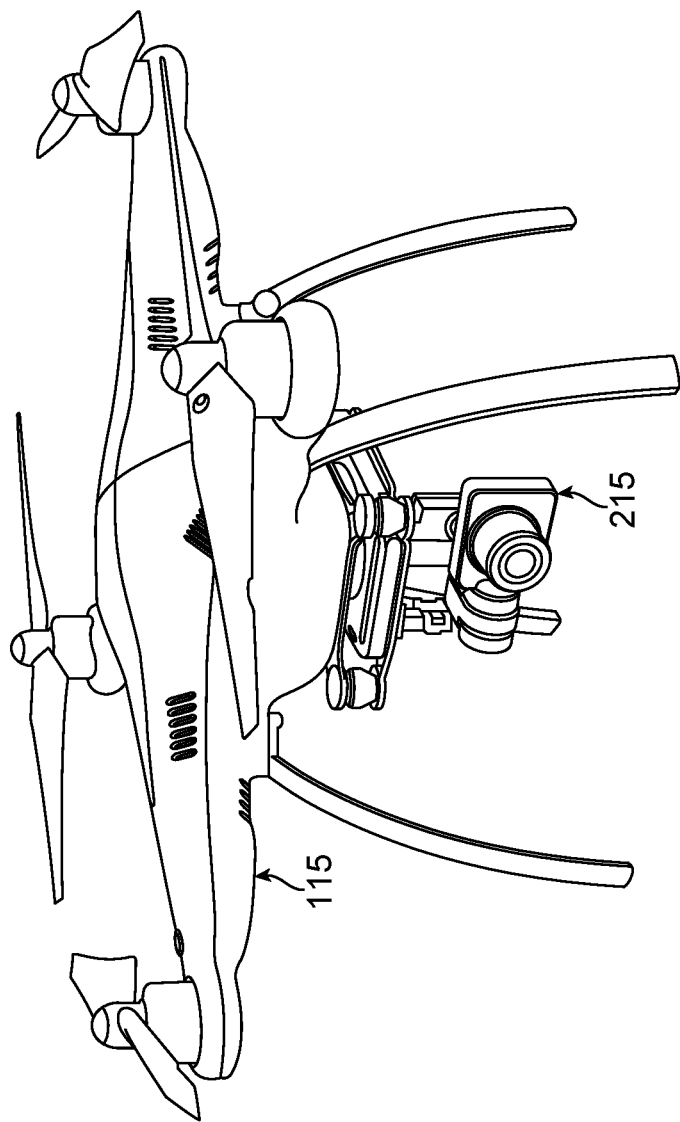
FIG. 7 is a diagram of an example UAV, according to an embodiment.

FIG. 7 is a diagram of an example UAV 115, according to an embodiment. The example UAV 115 is a quadcopter with four rotors to provide aerodynamic lift to the UAV 115 as well as to accelerate and rotate the UAV 115, as further described in conjunction with FIG. 2. The UAV 115 includes a camera 215, as further described in conjunction with FIG. 2. The camera 215 is coupled to the UAV 115 via one or more actuators or other mechanisms to control orientation of the camera 215.

IX. Additional Configuration Considerations

The disclosed embodiments beneficially allow for improved coverage of an event through the messaging platform 100 and the UAV 115. The UAV 115 beneficially provides a dedicated feed of an event that records a larger quantity of media than that recorded by individual account holders. The UAV 115 can fly, so the recorded coverage of the event may have more diverse geographic coverage and may include aerial coverage to provide a bigger picture view of an event. By allowing accounts to interact with the UAV 115 through commands, the messaging platform 100 promotes increased engagement with the messaging platform 100 and improves relevance of event coverage to account holders of the messaging platform 100. Through prominence of on-UAV payloads (e.g., light shows, displays, speakers), attendees of the event become more aware of the messaging platform 100 and are more likely to engage with the messaging platform 100 to provide their unique perspective on the event.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein. One or more steps of the processes or methods described herein (e.g., that illustrated in FIG. 4) are repeated concurrently by multiple threads. Thus, one or more of the steps can be performed serially, in parallel, and/or by a distributed system, in accordance with various embodiments of the invention.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations. For example, the functionality of the data repositories or modules (e.g., the TBM engine 150) may be performed, partially or entirely, by the social media platform 100, the client 105, or another hardware device (e.g., a server).

The data repositories (e.g., 140, 142, 144, 146) may be implemented as a database and/or storage service residing on one or more servers. For example, one or more of the data repositories may be implemented as a storage service using service-oriented architecture (SOA), a distributed database management system (DBMS), a clustered database, a stand-alone flat file, and/or any storage software residing on one or more physical storage devices. Examples of a storage device may include, but are not limited to, a hard disk drive, a solid state drive, and/or other memory device.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a messaging-enabled UAV through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method comprising:
identifying, by a messaging platform system, a plurality of users having user accounts on the messaging platform system and who are physically present at an event;
obtaining, by the messaging platform system, a plurality of user messages published by the messaging platform system that were authored by one or more of the plurality of users who are physically present at the event;
identifying, from user content of the plurality of user messages published by the messaging platform system that were authored by one or more of the plurality of users who are physically present at the event, an entity at the event referenced in one or more of the plurality of user messages;
comparing the user content of the plurality of user messages to UAV content captured by an unmanned aerial vehicle (UAV) at the event; and
publishing, using an account on the messaging platform system, a new message having UAV content of the entity at the event.

2. The method of claim 1, further comprising sending, by the messaging platform system to the UAV at the event, a command to capture additional content of the entity at the event referenced in the one or more of the plurality of user messages.

3. The method of claim 2, further comprising:
capturing, in response to receiving the command by the UAV, the additional content of the entity at the event.

4. The method of claim 1, wherein identifying the entity at the event referenced in one or more of the plurality of user messages comprises computing a measure of image similarity between image content in the plurality of user messages and image content captured by the UAV.

5. The method of claim 1, wherein identifying the entity at the event referenced in one or more of the plurality of user messages comprises identifying the entity from texts of the plurality of user messages.

6. The method of claim 1, wherein the new message having UAV content comprises image or video content captured by the UAV.

7. The method of claim 1, wherein obtaining the plurality of user messages published by the messaging platform system that were authored by one or more of the plurality of users who are physically present at the event comprises:
ranking messages authored by the users physically present at the event by a measure of user engagement; and
selecting a subset of highest ranking messages by the measure of user engagement.

8. The method of claim 1, wherein identifying the plurality of users who are physically present at the event comprises comparing location information associated with messages to a location of the event.

9. The method of claim 1, wherein obtaining the plurality of user messages comprises obtaining the plurality of user messages authored during a time period in which the event is occurring.

10. The method of claim 1, wherein publishing the new message having the UAV content of the entity at the event comprises publishing the new message using an account associated with the UAV at the event.

11. A system comprising:
one or more computers and one or more storage devices storing instructions that are operable, when executed by the one or more computers, to cause the one or more computers to perform operations comprising:
identifying, by a messaging platform system, a plurality of users having user accounts on the messaging platform system and who are physically present at an event;
obtaining, by the messaging platform system, a plurality of user messages published by the messaging platform system that were authored by one or more of the plurality of users who are physically present at the event;
identifying, from user content of the plurality of user messages published by the messaging platform system that were authored by one or more of the plurality of users who are physically present at the event, an entity at the event referenced in one or more of the plurality of user messages;
comparing the user content of the plurality of user messages to UAV content captured by an unmanned aerial vehicle (UAV) at the event; and
publishing, using an account on the messaging platform system, a new message having UAV content of the entity at the event.

12. The system of claim 11, further comprising sending, by the messaging platform system to the UAV at the event, a command to capture additional content of the entity at the event referenced in the one or more of the plurality of user messages.

13. The system of claim 12, further comprising:
capturing, in response to receiving the command by the UAV, the additional content of the entity at the event.

14. The system of claim 11, wherein identifying the entity at the event referenced in one or more of the plurality of user messages comprises computing a measure of image similarity between image content in the plurality of user messages and image content captured by the UAV.

15. The system of claim 11, wherein identifying the entity at the event referenced in one or more of the plurality of user messages comprises identifying the entity from texts of the plurality of user messages.

16. The system of claim 11, wherein the new message having UAV content comprises image or video content captured by the UAV.

17. The system of claim 11, wherein obtaining the plurality of user messages published by the messaging platform system that were authored by one or more of the plurality of users who are physically present at the event comprises:
ranking messages authored by the users physically present at the event by a measure of user engagement; and
selecting a subset of highest ranking messages by the measure of user engagement.

18. The system of claim 11, wherein identifying the plurality of users who are physically present at the event comprises comparing location information associated with messages to a location of the event.

19. The system of claim 11, wherein obtaining the plurality of user messages comprises obtaining the plurality of user messages authored during a time period in which the event is occurring.

20. One or more non-transitory computer storage media encoded with computer program instructions that, when executed by one or more computers, cause the one or more computers to perform operations comprising:
identifying, by a messaging platform system, a plurality of users having user accounts on the messaging platform system and who are physically present at an event;
obtaining, by the messaging platform system, a plurality of user messages published by the messaging platform system that were authored by one or more of the plurality of users who are physically present at the event;
identifying, from user content of the plurality of user messages published by the messaging platform system that were authored by one or more of the plurality of users who are physically present at the event, an entity at the event referenced in one or more of the plurality of user messages;
comparing the user content of the plurality of user messages to UAV content captured by an unmanned aerial vehicle (UAV) at the event; and
publishing, using an account on the messaging platform system, a new message having UAV content of the entity at the event.

* * * * *